(12) United States Patent
Dunn (10) Patent No.: US 8,720,017 B2
(45) Date of Patent: May 13, 2014

(54) LOCKING MECHANISM

(71) Applicant: Jerauld Dunn, Iola, WI (US)

(72) Inventor: Jerauld Dunn, Iola, WI (US)

( * ) Notice: Subject to any disclaimer, the term of this patent is extended or adjusted under 35 U.S.C. 154(b) by 0 days.

(21) Appl. No.: 13/784,911

(22) Filed: Mar. 5, 2013

(65) Prior Publication Data

US 2013/0177353 A1 Jul. 11, 2013

Related U.S. Application Data

(63) Continuation-in-part of application No. 13/169,068, filed on Jun. 27, 2011, now Pat. No. 8,393,059.

(51) Int. Cl.
*F16B 2/06* (2006.01)

(52) U.S. Cl.
USPC ............... 24/535; 24/457; 24/489; 24/494; 24/496; 24/516; 24/538; 24/544

(58) Field of Classification Search
CPC ............ F16B 2/06; F16B 2/10; F16B 7/0433; F16B 2/185

USPC ........... 24/457, 489, 494, 498, 516, 535, 538, 24/544

See application file for complete search history.

(56) References Cited

U.S. PATENT DOCUMENTS

| 4,485,530 A | 12/1984 | Begley et al. |
| 4,718,151 A | 1/1988 | LeVahn et al. |
| 5,727,899 A | 3/1998 | Dobrovolny |
| 5,888,197 A | 3/1999 | Mulac et al. |
| 7,566,038 B2 | 7/2009 | Scott et al. |
| 2010/0299890 A1 | 12/2010 | Doyle |

*Primary Examiner* — Robert J Sandy
*Assistant Examiner* — David Upchurch
(74) *Attorney, Agent, or Firm* — Thomas J. Nikolai; Nikolai & Mersereau, P.A.

(57) ABSTRACT

A locking mechanism for joining an elongate member to an assembly may include a frame, clamp, actuator and link between the clamp and actuator. Stop surfaces on the clamp and actuator cooperate to secure the elongate member. A pin and the force transmitted by a compression spring may further be provided for additional security. The link between the clamp and actuator retracts the clamp permitting the elongate member to be detached from the assembly. A linear actuator may be operatively disposed between the frame and the actuator for opening and closing the clamp about the elongate member.

13 Claims, 7 Drawing Sheets

LOCKING MECHANISM

CROSS-REFERENCED TO RELATED APPLICATIONS

This is a continuation-in-part of application Ser. No. 13/169,068, filed Jun. 27, 2011.

STATEMENT REGARDING FEDERALLY SPONSORED RESEARCH OR DEVELOPMENT

Not applicable.

BACKGROUND OF THE INVENTION

I. Field of the Invention

The present invention relates generally to locking mechanisms. More specifically, the present invention relates to locking mechanisms designed to attach in a secure fashion elongate members such as a bar, pipe, rail or the like to an assembly.

II. Related Art

Various hitches and clamping arrangements have been used to couple farm implements to a tractor or attachments to a work vehicle. Likewise, various clamping arrangements have been used in the construction of scaffolding and other assemblies used in the building construction, maintenance and repair industries. Various clamping arrangements have also been used in connection with watercraft and the riggings for watercraft. Various clamping arrangements have been used in the assembly of sporting, camping and other recreational equipment. Most such clamping arrangements are designed for the specific application. Many require substantial time and effort to use the clamp to form an attachment. Many such clamps also typically require periodic inspection and maintenance to ensure safety. Thus, there continues to exist in the art a real need for a clamp having broad application which is inexpensive to construct, easy to operate and provides the required margin of safety.

SUMMARY OF THE INVENTION

The present invention relates to a locking device for coupling an elongate member such as a bar, rail, tube, pipe or the like to an assembly. The locking device comprises an outer frame fixed to and extending from the assembly. The outer frame comprises one or more side plates. When more than one side plate is used, the side plates extend in a parallel spaced relation to each other from a portion of the assembly. Typically, two such side plates are used. Each of the side plates includes an elongate member receiving recess.

The locking device also includes a clamp comprising at least one clamp plate. Typically two clamp plates are used. Each of the clamp plates includes a member retention surface and a stop surface. A rotating link coupler is also attached to at least one of the clamp plates. This rotating link coupler includes an orifice surrounded by an engagement surface. The clamp is attached to the outer frame so the clamp is rotatable relative to the outer frame.

The locking device also includes an actuator comprising at least one actuator plate. Typically, two are used. The actuator plates have a second stop surface. At least one rotating link coupler is also attached to the actuator. This rotating link coupler also includes an orifice surrounded by an engagement surface. The actuator is coupled to the outer frame so that the actuator is rotatable relative to the outer frame.

The clamp also includes a bolt and a compression spring. The shaft of the bolt extends between the rotating link coupler of the clamp and the rotating link coupler of the actuator. The compression spring surrounds the shaft of the bolt such that one end of the spring engages the engagement surface of the rotating link coupler of the clamp and the second end of the spring engages the engagement surface of the rotating link of the actuator.

The locking device is used by positioning an elongate member such as a bar, pipe, rail or the like in the elongate member receiving recess(es) of the outer frame. The actuator is then rotated in a first direction which causes the bolt and spring arrangement to rotate the clamp into a first position. Upon further rotation of the actuator in the first direction, the actuator, clamp and bolt and spring arrangement reach an over center position such that the clamp locks the elongate member in the elongate member receiving recesses of the frame. Rotation of the actuator in the second direction causes the bolt and spring arrangement to rotate the clamp into a second position freeing the elongate member so that it can be removed from the elongate member receiving recess.

Advancing the actuator into the over center position will sufficiently secure the elongate member in most applications This is because the spacing between the actuator plates and the clamp plates are such that forces imparted upon the clamp plates that might cause the clamp to open instead cause the stop surfaces of the clamp plates to engage the stop surfaces of the actuator to prevent opening of the clamp. An additional margin of safety can be provided using a safety pin having a shaft. When the clamp is in the closed position, this pin can be inserted into a hole through a side plate of the outer frame such that the shaft engages a first safety pin engagement surface on the actuator to prevent rotation of the actuator. Likewise, the clamp can be held in the open position by inserting the safety pin through the same hole and engaging a second safety pin engagement surface on the actuator.

When multiple plates are used to form the clamp and actuator, spacers may be placed between the plates of the clamp and similarly spacers can be positioned between the plates of the actuator to retain such plates in the proper spaced relationship. A handle may also be provided as a part of the actuator to provide an appropriate mechanical advantage when moving the actuator. One or more stops which also engage the stop surfaces of the actuator and/or clamp may also be provided to prevent over rotation of the actuator and clamp in either direction.

As will be discussed further in the detailed description provided below, the various components may be made out of any suitable material. The material selected must, of course, provide sufficient strength and durability. In certain applications, weight may also be a factor used in selecting the materials used for construction of the locking device.

DETAILED DESCRIPTION

Figure 1:
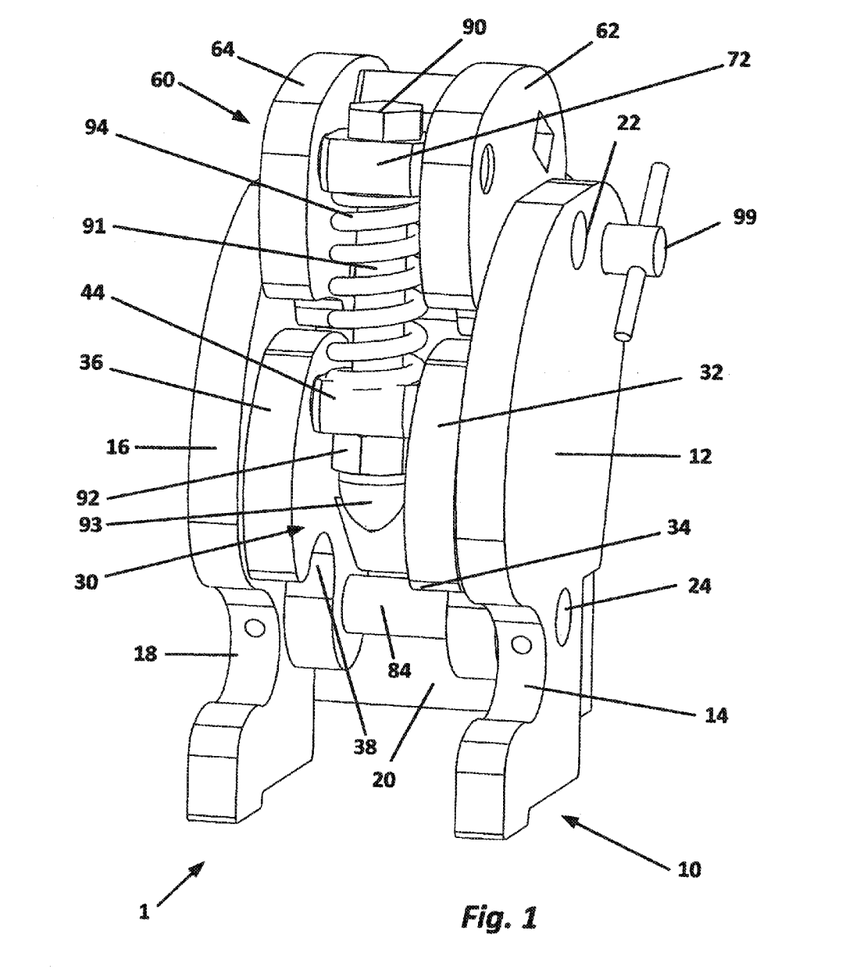
FIG. 1 is a perspective view of a locking device, made in accordance with the present invention, in its open position.
Figure 2:
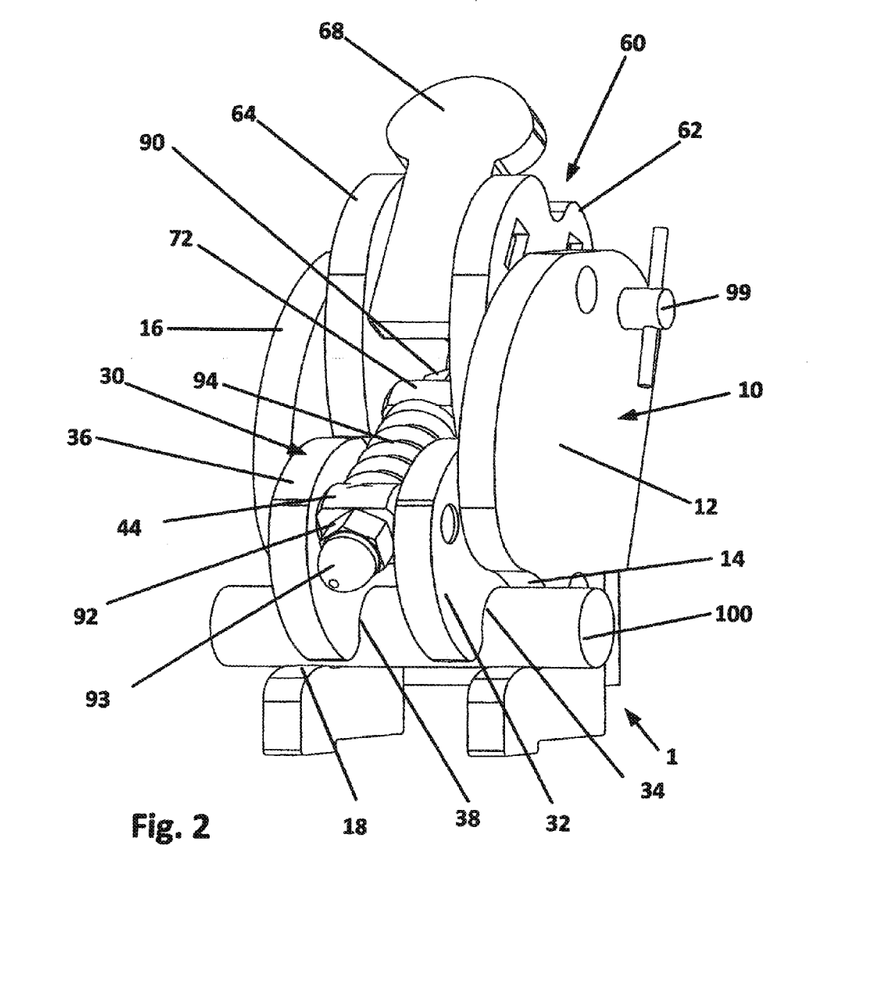
FIG. 2 is perspective view of the locking device of FIG. 1 with an elongate member positioned within the locking device and the locking device in its closed position.
Figures 3, 4, 5:
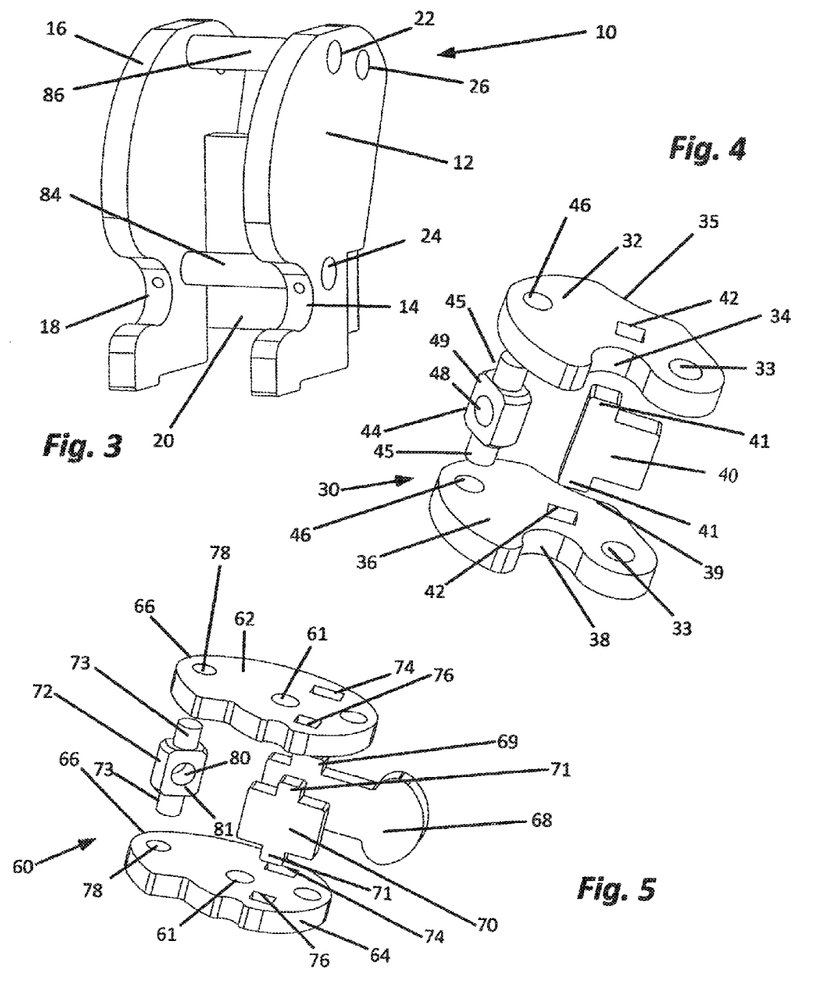
FIG. 3 is a perspective view showing the outer frame of the locking device of FIG. 1.
FIG. 4 is an exploded perspective view showing the components of the clamp of the locking device shown in FIG. 1.
FIG. 5 is an exploded perspective view showing the components of the actuator of the locking device shown in FIG. 1.

Referring first to FIGS. 1-3, the locking device 1 shown includes a frame 10 comprising a first side plate 12 having an elongate member receiving recess 14. The frame 10 includes a second side plate 16 also having an elongate member receiving recess 18. The frame 10 also includes a stop 20, the function of which will be discussed below. Both side plate 12 and side plate 16 extend in parallel spaced relation to each other from a portion of an assembly (not shown).

Further details related to the construction of the outer frame are shown in FIG. 3. As shown, each side plate 12 and 16 of the frame has three holes 22, 24 and 26. The function of these holes will become clearer from the description of the full assembly provided below.

The locking device 1 shown in FIGS. 1-2 also includes a clamp 30. The clamp 30 includes a plate 32, including a retention surface 34, and a plate 36 including a retention surface 38. As shown in FIG. 2, when the clamp is in the closed position, the retention surfaces 34 and 38 engage an elongate member 100 to retain the elongate member within the elongate member receiving recesses 14 and 18 of the outer frame 10.

Further details related to the construction of the clamp 30 are provided in FIG. 4. As shown, the clamp 30, in addition to the plates 32 and 36 and the elongate member retention surfaces 34 and 38, includes stop surfaces 35 and 39. The plates 32 and 36 are held in spaced relation by a spacer 40. Spacer 40 includes two outwardly extending rectangularly-shaped ears 41 which mate with rectangularly-shaped holes 42 in the plates 32 and 36 such that spacer 40 does not rotate or move with respect to plates 32 and 36. A rotating link coupler 44 is also provided. Rotating link coupler 44 has a pair of opposed cylindrically-shaped ears 45 which mate cylindrically-shaped holes 46 in the plates 32 and 36 so that the rotating link coupler 44 is permitted to rotate with respect to plates 32 and 36 about a longitudinal axis passing through the center of the two ears 45. Rotating link coupler 44 also has an orifice 48 extending through the spacer. Orifice 48 is surrounded by an engagement surface 49.

Returning again to FIGS. 1 and 2, the locking device is also shown to include an actuator 60. The actuator likewise includes a pair of actuator plates 62 and 64. The construction of the actuator is better shown in FIG. 5. As shown in FIG. 5, the plates 62 and 64 of the actuator each include a stop surface 66. The two plates are held in parallel spaced relation by a handle 68 and a spacer 70. The handle 68 has opposed rectangularly-shaped ears 69 which mate with rectangularly-shaped holes 74 in the plates 62 and 64. Likewise, spacer 70 has a pair of rectangularly-shaped ears 71 which mate with rectangularly-shaped holes 76 in the plates 62 and 64. As such the handle 68 and the spacer 70 are held in a fixed position relative to the plates 62 and 64. Actuator 60 also has a rotating link coupler 72. Rotating link coupler 72 has a pair of cylindrically-shaped ears 73 which mate cylindrically-shaped holes 78 in the plates 62 and 64 such that the rotating link coupler 72 can rotate with respect to the plates 62 and 64 about a longitudinal axis extending through the centers of the ears 73. Rotating link coupler 72 has an orifice 80 surrounded by an engagement surface 81.

As shown in FIG. 4, each of the plates 32 and 36 of the clamp 30 include a cylindrical hole 33 passing through the plate. A pin 84 (shown in FIG. 3) is passed through the holes 33 of the clamp. End portions of pin 84 are also mated with the holes 24 in side plates 12 and 16 of the frame 10 to pivotally mount the clamp 30 to the frame 10. Similarly, each of plates 62 and 64 of the actuator 60 include a hole 61. See FIG. 5. A pin 86 shown in FIG. 3 passes through the holes 81 and mates the holes 22 of the plates 12 and 16 of the frame 10 to pivotally mount the actuator 60 to the frame 10.

As shown in FIGS. 1 and 2, the assembly of the locking device 1 is complete by creating a link between the clamp 30 and actuator 60. The drawings show this being done by passing the shaft 91 of bolt 90 through the orifice 80 of the rotating link coupler 72 of the actuator 60, a compression spring 94, the orifice 48 of the rotating link coupler 44 of the clamp 30 and then attaching a nut 92 to the bolt 90 to fix the bolt 90 in place. A cap 93 can also be attached to the exposed end of the shaft 91 of the bolt. When so assembled, the one end of the spring 94 engages the engagement surface 49 of rotating link coupler 44 of the clamp 30 and the other end of spring 94 engages the engagement surface 81 of rotating link coupler 72 of the actuator 60. Those skilled in the art will recognize that different springs may be selected for use based on the desired or required spring force to be delivered by the spring. The assembly can also include a safety pin which passes through the holes 26 in the plates 12 and 16 of the frame 10 and engages safety pin engagement surfaces on the plates of the actuator as will be discussed in further detail below with references to FIGS. 6 and 7.

Figures 6, 7:
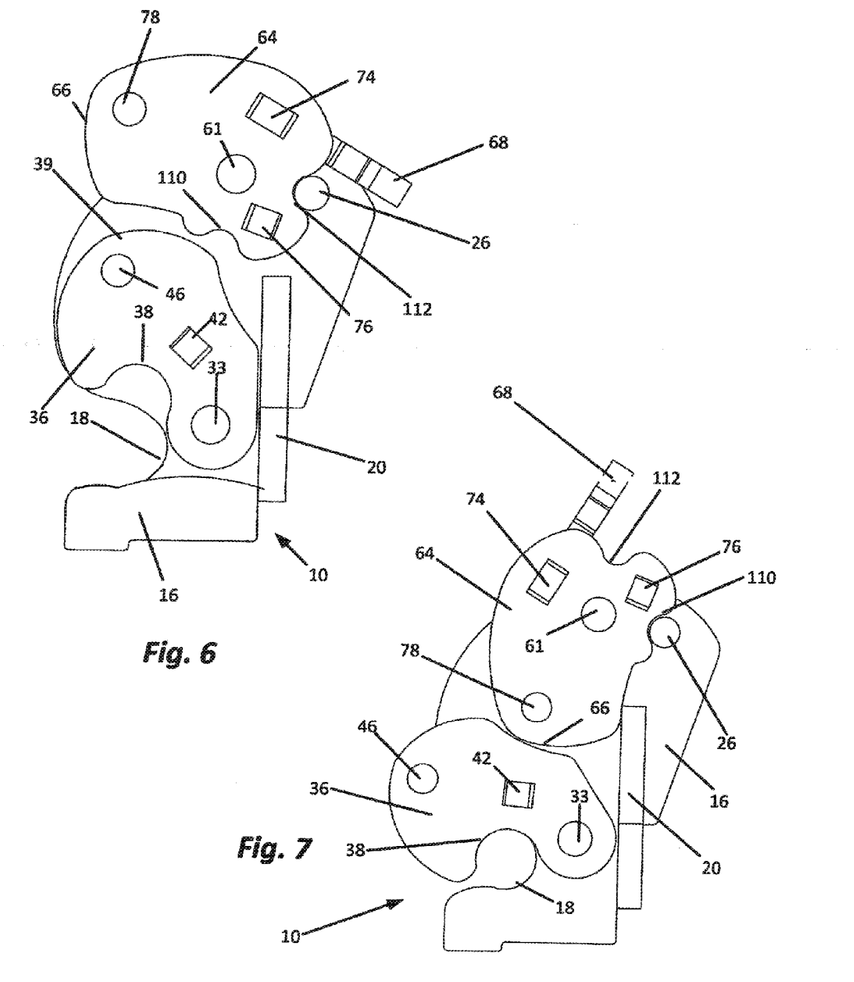
FIG. 6 is a side view of one of the side plates of the frame, one of the plates of the clamp and one of the plates of actuator to demonstrate the position of these plates when the locking device is open.
FIG. 7 shows the same components of the locking device as shown in FIG. 6 but with the locking device in its closed position.

FIGS. 6 and 7 are illustrative of plate 16 of the frame 10 attached to a portion of an assembly (not shown) with the plate 36 of the clamp and plate 64 of the actuator pivotally attached to the plate 16 of the frame. Various spacers, pivot pins, the safety pin and the link comprising the rotating link couplers, the bolt and spring arrangement shown in FIGS. 1 and 2 are not shown in FIGS. 6 and 7 to better illustrate movement of the actuator plate 64 with respect to the clamp plate 36. As shown in FIG. 6, the actuator plate 64 and the clamp plate 36 are both in their open position permitting an elongate member (such as 100 shown in FIG. 2) to be inserted into or removed from the elongate member receiving recess 18 of the frame 10. Upon rotation of the actuator plate 64 in the counter-clockwise direction, the link formed by rotating link couplers 44 and 72, bolt 90, spring 94 and nut 92 causes the clamp plate 36 to also rotate in a counter-clockwise direction such that the elongate member retention surface 38 covers the opening to the elongate member receiving recess 18 of plate 16.

FIG. 7 shows how rotation of the actuator plate 64 and clamp plate 36 will continue until the actuator plate 64 engages the stop 20. In this position, the stop surface 66 of actuator plate 64, clamp plate 36 and link comprising rotating link couplers 44 and 72, bolt 90, spring 94 and nut 92 are over center such that movement of the actuator plate 64 and clamp plate 36 in the clockwise direction is resisted. More specifically, forces which might cause the clamp plate 36 to open, given the tolerances of the design, instead cause the stop surface 39 of the clamp plate 36 to engage the stop surface 66 of the actuator plate 64 to resist such forces and prevent the clamp from opening. Such movement is also resisted by the force of spring 94. To ensure that no such counterclockwise motion occurs, a pin (such as pin 99 shown in FIGS. 1 and 2) can be inserted through hole 26 in plate 16 so that the shaft of the pin engages a first safety pin engagement surface 110 on actuator plate 64 to prevent such rotation and securely locking the clamp plate 36 in the position shown in FIG. 7. Likewise, to hold the clamp plate 36 in the open position shown in FIG. 6, such a pin can be inserted through hole 26 such that the shaft engages second safety pin engagement surface 112.

As the actuator plate 64 moves in the clockwise direction from the position shown in FIG. 7 to the position shown in FIG. 6, the link formed by rotating link couplers 44 and 72, bolt 90, spring 94 and nut 92 shown in FIGS. 1 and 2 causes the clamp plate 36 to follow the actuator plate 64 and also rotate in the clockwise direction until the stop surface 39 of clamp plate 36 engages stop 20. Stop 20 prevents over rotation of the entire assembly.

From the foregoing those skilled in the art will appreciate that locking devices of the present invention may be employed in a variety of situations to provide firm and secure locking of an elongate member to an assembly. A secure connection is provided and ensured not only by the over center position of the stop surfaces when the clamp plates 32 and 36 are in the closed position but also by the additional provision of a safety pin 99 which prevents any rotation of the actuator and clamp plates until the pin 99 is removed. Further, the force applied by the compression spring 94 provides an additional margin of safety.

One skilled in the art will also recognize from the foregoing that various modifications can be made without deviating from the invention. First, rather than using a pair of plates to form the actuator 60 and a pair of plates to form the clamp 30, a single plate actuator and a single plate clamp could be used. Likewise, more than two plates could be used to form the actuator 60 and clamp 30. Springs which apply differing spring forces may also be used.

Various materials can also effectively be used in forming a locking mechanism in accordance with the present invention. Steel, aluminum, iron and other metals could be used. Various high strength polymers such as nylon or the like could also be employed. Additional features may also be provided without departing from the invention. For example, the surfaces of the elongate member receiving recesses 14 and 18 of the frame 10 and the retention surfaces 34 and 38 of the clamp 30 may be padded to prevent marring of the finish of any elongate member 100 attached to an assembly using the locking device 1 of the present invention. The receiving surfaces and retention surfaces could also be provided with a series of narrow ridges to provide a better grip on the elongate member 100. The shapes and sizes of the various components may also be modified as appropriate.

Alternative Embodiment

The previously described embodiments contemplate that the locking device for coupling an elongate member to an assembly is to be manually actuated by rotating the actuator 60 after the elongate member is positioned within the elongate member receiving recess 14-18 using the handle 68. The embodiment of FIGS. 8-10 teaches a way of actuating the locking device onto an elongate member from a more remote location.

Figure 8:
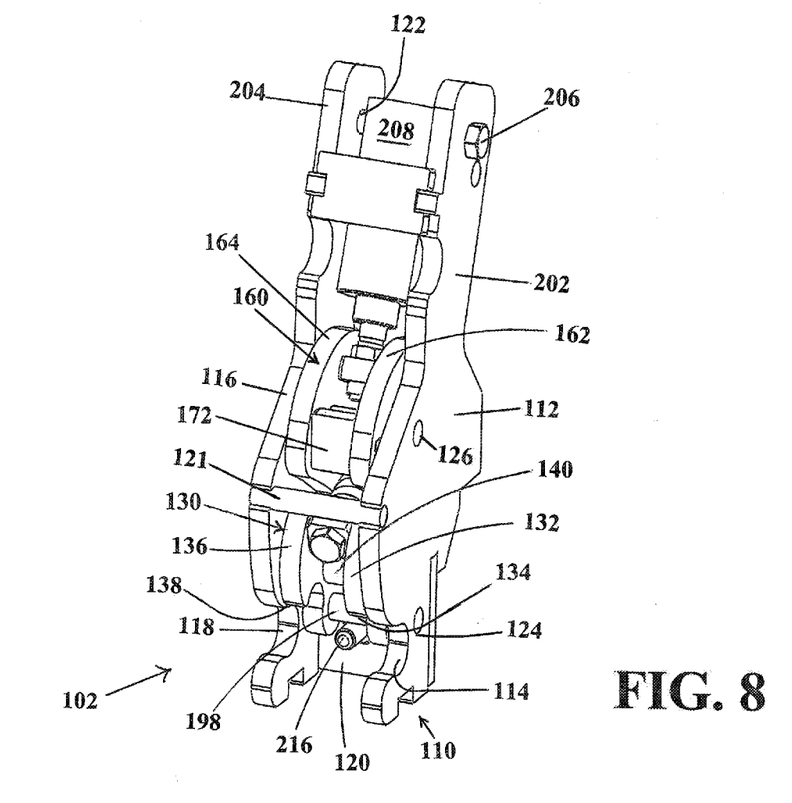
FIG. 8 is a perspective front view of an alternative embodiment facilitating automatic operation of the locking mechanism with the clamp open.

Referring first to FIG. 8, the locking device 102 includes a frame 110 comprising a first side plate 112 having an elongate member receiving recess 114. The frame 110 includes a second side plate 116, also having an elongate member receiving recess 118. The frame 110 also includes a first stop 120 and a second stop 121, the functions of which will be discussed below. Both side plate 112 and side plate 116 extend in parallel, spaced relation to each other and are adapted to be connected to an assembly (not shown). With continued reference to FIG. 8, each side plate 112 and 116 of the frame 110 has three holes 122, 124 and 126 formed through the thickness dimension of the side plates.

Figure 9:
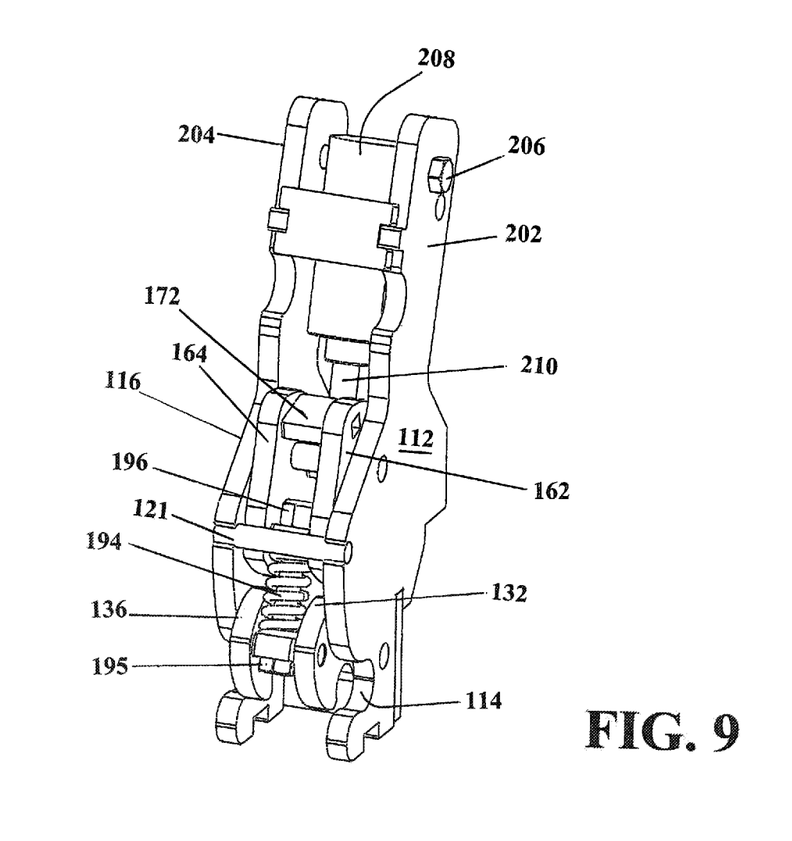
FIG. 9 is a view like FIG. 8 with the clamp closed.

The locking device 102, like the earlier embodiments, includes a clamp 130 having a first plate 132 that includes a retention surface 134, and a second plate 136 that includes a retention surface 138. As shown in FIG. 9, when the clamp is in its closed position, the retention surfaces 134 and 138 are made to engage an elongate member such as a cylinder rod as at 100 in FIG. 2 so as to retain the elongate member within the elongate member receiving recesses 114 and 118 of the outer frame 110.

Figure 10:
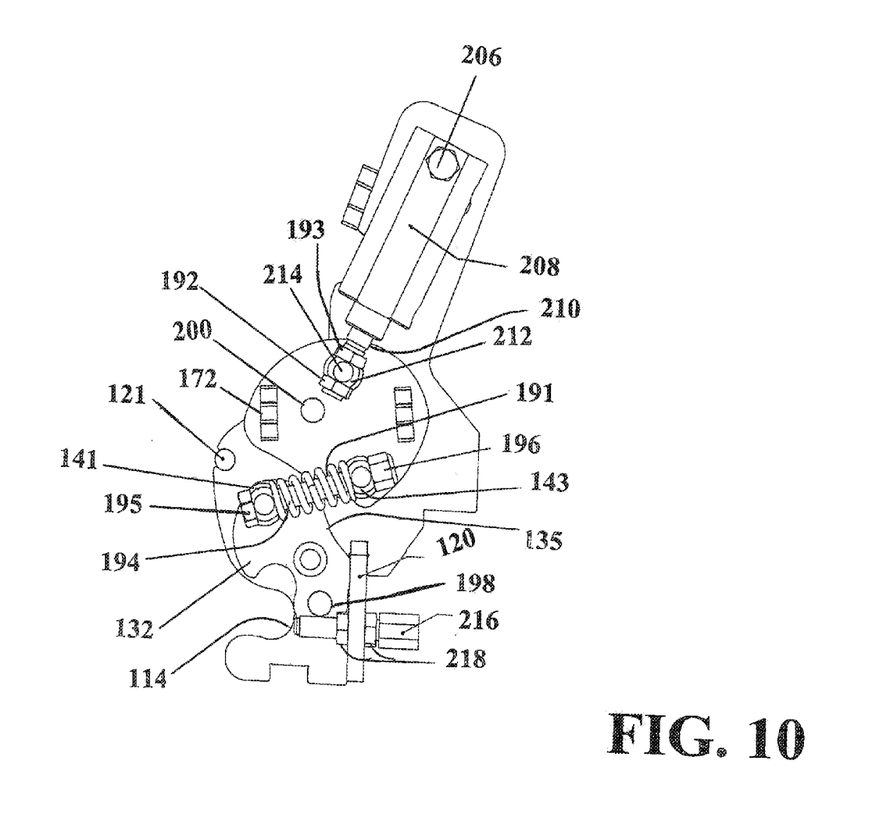
FIG. 10 is a right side view with the right hand plate removed to show the automatic actuation features of the locking mechanism.

Further details related to the construction of the clamp 130 can be seen in FIG. 10. As shown there, the clamp 130, in addition to the plates 132 and 136 and the elongate member retention surfaces 134 and 138, includes stop surfaces, as at 135 on the plate 132. The plates 132 and 136 are held in parallel, spaced relation by a spacer member 140. Extending between the clamp plates 132 and 136 is a rotatable coupler 141. Likewise, extending between the actuator plates 162 and 164 of the actuator 160 is a rotatable coupler 143 and spacer 172. The rotatable coupler 141 and 143 each comprise a hub having an aperture extending through it for receiving the shaft 191 of a bolt therethrough. As seen in FIG. 10, the shaft 191 is surrounded by a helical compression spring 194 and a nut 196 along with the bolt head 195 secures the bolt in place.

Inserted through the hole 124 and through an aligned hole in the second side plate 116 (not shown) is a pin 198 forming an axle about which the clamp plates 132 and 136 can rotate relative to the first and second side plates 112 and 116.

In a similar fashion, a pin 200 journals the actuator assembly 160 relative to the first and second side plates 112 and 116.

In the embodiment of FIGS. 8-10, the first and second side plates 112 and 116 each include an upwardly extending elongate arm 202 and 204 and secured between the two arms by a through bolt 206 is a linear actuator 208 which, in practice, may be either a hydraulic or an air cylinder or alternatively, an electrical solenoid adapted to be operated from a remote position, such as by an operator in the cab of a work vehicle. As best seen in FIG. 10, the piston rod 210 of the linear actuator 208 passes through a rotatable coupler that is journaled for rotation in the actuator plates 162 and 164 at a location that is laterally offset from the pivot pin 200 of the actuator thereby providing a lever arm for the linear actuator 208 to work against. Adjustment is possible by turning nuts 192 and 193.

As can be seen in FIGS. 8 and 10, passing through the stop 120 and extending to the rear of the elongate member receiving recesses 114 and 118 is a sensor 216 that is positionable relative to the elongate member receiving recesses 114 and 118 by adjustment nuts 218. The sensor may be of any suitable type capable of detecting when an elongate member is resident within the elongate member receiving recesses 114 and 118. Without limitation, the sensor may simply be an electromechanical switch, a magnetic sensor such as a Hall device or other type of proximity sensor known in the art.

In operation, the assembly to which the locking device 102 is attached may be moved so as to be brought into proximity to an elongate member. When the sensor 216 detects that an elongate member is resident within the receiving recesses 114 and 118, the linear actuator 208 may be operated automatically (or manually) from a remote location to extend the piston rod 210 and in doing so, rotation is imparted in a clockwise direction, as viewed in FIG. 10, to the actuator assembly 160 which then pivots about the pin 200, forcing the clamping plates 132 and 136 to rotate in a counterclockwise direction about the pin 198 and thereby capturing the elongate member within the recesses 114 and 118 of the first and second side plates 112 and 116. Those skilled in the art will appreciate that, initially, as the piston rod 210 is made to extend, it works against the compression spring 194 until an over-center position is reached, at which point the spring acts to maintain the retention surfaces 134 and 138 of the clamp firmly against the captured elongate member. Further rotation of the actuator is prevented by stop 121 after the over-center condition is reached.

It will be appreciated that unhooking or unfastening the elongate member from the locking mechanism will be achieved by again remotely operating the linear actuator 208 to withdraw its piston rod 210 back into its cylinder which has the effect of rotating the actuator 160 in a counterclockwise direction causing the clamp 130 to rotate in the clockwise direction opening the locking device.

The detailed description is not intended to be limiting, but rather to explain attributes of the invention and how they can be implemented. The invention is only limited by the claims recited below.

What is claimed is:

1. A locking device for coupling an elongate member to an assembly, the locking device comprising:
   a. an outer frame adapted to be fixed to the assembly, the outer frame comprising at least one side plate extending from a portion of the assembly, the plate including an elongate member receiving recess;
   b. a clamp comprising at least one clamp plate, the clamp plate including a member retention surface and a stop surface, and at least one rotating link coupler, the rotating link coupler including an orifice surrounded by an engagement surface, the clamp coupled to the side plate of the outer frame so that the clamp is rotatable relative to the outer frame;
   c. an actuator comprising at least one actuator plate having a second stop surface, at least one rotating link coupler, the rotating link coupler including an orifice surrounded by an engagement surface, the actuator coupled to the side plate of the outer frame so that the actuator is rotatable relative to the outer frame;
   d. a link comprising a bolt having a shaft passing between the hole of the rotating link coupler of the clamp and the hole of the rotating link coupler of the actuator and a compression spring surrounding the shaft of the bolt, the spring having a first end engaging the engagement surface of the rotating link coupler of the clamp and a second end engaging the engagement surface of the rotating link coupler of the actuator,
   wherein when an elongate member is positioned in the elongate member receiving recess of the outer frame, rotation of the actuator in a first direction causes the link to rotate the clamp into a first position, further rotation of the actuator in the first direction causes the actuator link and clamp to reach an over center position locking the elongate member in the elongate member receiving recess, and rotation of the actuator in a second direction causes the link to rotate the clamp into a second position freeing the elongate member so it is removable from the elongate member receiving recess; and
   e. a linear actuator operatively coupled between the outer frame and the actuator for selectively rotating the actuator in the first and second directions.

2. The locking device of claim 1 wherein the linear actuator comprises a hydraulic cylinder.

3. The locking device of claim 1 wherein the linear actuator comprises an air cylinder.

4. The locking device of claim 1 wherein the linear actuator comprises an electrical solenoid.

5. The locking device of claim 1 and further including an object sensor disposed proximate the elongate member receiving recess.

6. A locking device for coupling an elongate member to an assembly, the locking device comprising:
   a. an outer frame adapted to be fixed to the assembly, the outer frame comprising a pair of side plates extending in parallel spaced relation to each other from a portion of the assembly, each of the side plates including an elongate member receiving recess;
   b. a clamp comprising a pair of clamp plates, each of the clamp plates including a member retention surface and a first stop surface, and at least one rotating link coupler, the rotating link coupler including an orifice surrounded by an engagement surface, the clamp positioned between and coupled to the side plates of the outer frame so that the clamp is rotatable relative to the outer frame;
   c. an actuator comprising a pair of actuator plates, each of the actuator plates having a second stop surface, and at least one rotating link coupler, the rotating link coupler including an orifice surrounded by an engagement surface, the actuator positioned between and coupled to the side plates of the outer frame so that the actuator is rotatable relative to the outer frame;
   d. a link comprising a bolt having a shaft passing between the hole of the rotating link coupler of the clamp and the hole of the rotating link coupler of the actuator, and a compression spring surrounding the shaft of the bolt, the spring having a first end engaging the engagement surface of the rotating link coupler of the clamp and a second end engaging the engagement surface of the rotating link coupler of the actuator; and
   e. a linear actuator operatively coupled between the outer frame and the pair of actuator plates,
   wherein when an elongate member is positioned in the elongate member receiving recesses of the outer frame, rotation of the actuator plate in a first direction by the linear actuator causes the link to rotate the clamp into a first position, further rotation of the actuator in the first direction by the linear actuator causes the actuator clamp and link to reach an over center position locking the elongate member in the elongate member receiving recesses, and rotation of the actuator in a second direction by the linear actuator causes the link to rotate the clamp into a second position freeing the elongate member so it is removable from the elongate member receiving recess.

7. The locking device of claim 6 wherein the linear actuator comprises a hydraulic cylinder.

8. The locking device of claim 6 wherein the linear actuator comprises an air cylinder.

9. The locking device of claim 6 wherein the linear actuator comprises an electrical solenoid.

10. The locking device of claim 6 and further including an object sensor disposed proximate the elongate member receiving recess.

11. A locking device for coupling an elongate member to an assembly, the locking device comprising:

a. an outer frame adapted to be fixed to the assembly, the outer frame comprising a pair of side plates extending in parallel spaced relation, to each other from a portion of the assembly, each of said side plates having first and second holes and an elongate member receiving recess;
b. a clamp comprising a second pair of plates each including a hole therethrough, a member retention surface and a stop surface, a shaft passing through the holes of the plates of the second pair of plates and into each of the first holes of the pair of side plates to couple the clamp to the outer frame between the pair of side plates of the outer frame so that the clamp is rotatable relative to the outer frame, at least one spacer extending between the second pair of plates for retaining the plates of the second pair of plates generally parallel to each other, and a rotating link coupler, the rotating link coupler having an orifice surrounded by a surface and being rotatable with respect to the pair of side plates along an axis substantially perpendicular to the pair of side plates;
c. an actuator comprising a third pair of plates each including a hole therethrough and at least one stop surface, a shaft passing through the holes of the plates of the third pair of plates and into each of the second holes of the plates of the pair of side plates to couple the actuator to the outer frame between the pair of side plates of the outer frame so that the actuator is rotatable relative to the outer frame, at least one rotating link coupler, the rotating link coupler having an orifice surrounded by a surface and rotatable with respect to the plates along an axis substantially perpendicular to the plates, and at least one spacer for retaining the plates of the third pair of plates generally parallel to each other,
d. a link comprising a bolt having a shaft passing between the holes of the rotating link couplers of the clamp and actuator and a compression spring surrounding the shaft of the bolt and having a first end engaging the surface surrounding the orifice of the rotating link coupler of the clamp and a second end engaging the surface surrounding the orifice of the rotating link coupler of the actuator, and
e. a linear actuator operatively coupled between the pair of side plates and the actuator,
wherein when an elongate member is positioned in the elongate member receiving recesses of the outer frame, rotation of the actuator in a first direction by the linear actuator causes the link to rotate the clamp into a first position, further rotation of the actuator in the first direction by the linear actuator causes the actuator, the clamp and the link to reach an over center position locking the elongate member in the elongate member receiving recess, and rotation of the actuator in a second direction by the linear actuator causes the link to rotate the clamp into a second position freeing the elongate member so it is removable from the elongate member receiving recesses.

12. The locking device of claim 11 wherein the linear actuator is one of a hydraulic cylinder, an air cylinder and an electrical solenoid.

13. The locking device of claim 11 and further including an object sensor positioned proximate the elongate member receiving recesses for sensing and remotely indicating the presence of an object in the elongate member receiving recesses.

* * * * *